United States Patent
Chou et al.

(10) Patent No.: US 9,374,237 B2
(45) Date of Patent: Jun. 21, 2016

(54) VIRTUAL RENDEZVOUS POINT (RP) ADDRESS FOR MULTICAST RP DEVICE

(71) Applicant: Verizon Patent and Licensing Inc., Basking Ridge, NJ (US)

(72) Inventors: Koutoung Chou, Plano, TX (US); Kuan-Ling Liu, Dallas, TX (US); Sylvia O. Pina, Arlington, TX (US); Jessica Robin, Murphy, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 115 days.

(21) Appl. No.: 14/180,537

(22) Filed: Feb. 14, 2014

(65) Prior Publication Data
US 2015/0236864 A1    Aug. 20, 2015

(51) Int. Cl.
| H04L 12/26 | (2006.01) |
| H04L 12/761 | (2013.01) |
| H04L 12/18 | (2006.01) |
| H04L 12/931 | (2013.01) |

(52) U.S. Cl.
CPC .......... *H04L 12/1886* (2013.01); *H04L 12/185* (2013.01); *H04L 45/16* (2013.01); *H04L 49/201* (2013.01)

(58) Field of Classification Search
CPC ....... H04L 45/16; H04L 12/185; H04L 12/18; H04L 45/00; H04L 49/201
USPC ........................................................ 370/390
See application file for complete search history.

(56) References Cited

U.S. PATENT DOCUMENTS

| 6,138,144 A * | 10/2000 | DeSimone .............. H04L 12/18 709/204 |
| 7,346,053 B1* | 3/2008 | Leung et al. .................. 370/390 |
| 7,471,645 B2* | 12/2008 | Torres et al. ................... 370/256 |
| 7,912,055 B1* | 3/2011 | Kleers et al. .................. 370/390 |
| 9,137,116 B1* | 9/2015 | Rijsman ................. H04L 41/12 |
| 2002/0083178 A1* | 6/2002 | Brothers ................ G06F 21/10 709/226 |
| 2002/0186652 A1* | 12/2002 | Popovich ....................... 370/218 |
| 2002/0186694 A1* | 12/2002 | Mahajan ............. H04L 12/4641 370/390 |
| 2005/0076207 A1* | 4/2005 | Park .................... H04L 12/4633 713/163 |
| 2008/0101361 A1* | 5/2008 | Brown .......................... 370/390 |
| 2011/0228770 A1* | 9/2011 | Dholakia et al. .............. 370/390 |
| 2012/0039334 A1* | 2/2012 | Mehta et al. .................. 370/390 |
| 2012/0170578 A1* | 7/2012 | Anumala et al. .............. 370/390 |

(Continued)

OTHER PUBLICATIONS

Cisco Systems, Inc., "Rendezvous Point Engineering", http://www.cisco.com/c/en/us/products/collateral/ios-nx-os-software/ip-multicast/whitepaper_c11-508498.html, Nov. 2008, 6 pages.

*Primary Examiner* — Omar Ghowrwal
*Assistant Examiner* — Sanjay K Dewan

(57) ABSTRACT

A device may determine multicast information associated with participating in a multicast. The multicast information may include a virtual rendezvous (RP) address and may identify a multicast group. The device may identify a primary RP address and a secondary RP address associated with the multicast group. The primary RP address may identify a primary RP device and the secondary RP address may identify a secondary RP device. The device may identify an active RP device. The active RP device may be the primary RP device or the secondary RP device. The device may replace the virtual RP address, included in the multicast information, with information that identifies the active RP device. The information that identifies the active RP device may be the primary RP address or the secondary RP address. The device may participate in the multicast based on the information that identifies the active RP device.

20 Claims, 14 Drawing Sheets

(56) References Cited

U.S. PATENT DOCUMENTS

| | | | |
|---|---|---|---|
| 2012/0204231 A1* | 8/2012 | Holtmanns | H04L 63/0815 726/3 |
| 2012/0317235 A1* | 12/2012 | Nguyen | H04L 12/18 709/219 |
| 2013/0003732 A1* | 1/2013 | Dholakia | H04L 12/18 370/390 |
| 2013/0070766 A1* | 3/2013 | Pudiyapura | 370/390 |
| 2014/0198706 A1* | 7/2014 | Jung et al. | 370/312 |
| 2014/0344477 A1* | 11/2014 | Shigeeda | H04L 61/2007 709/245 |

* cited by examiner

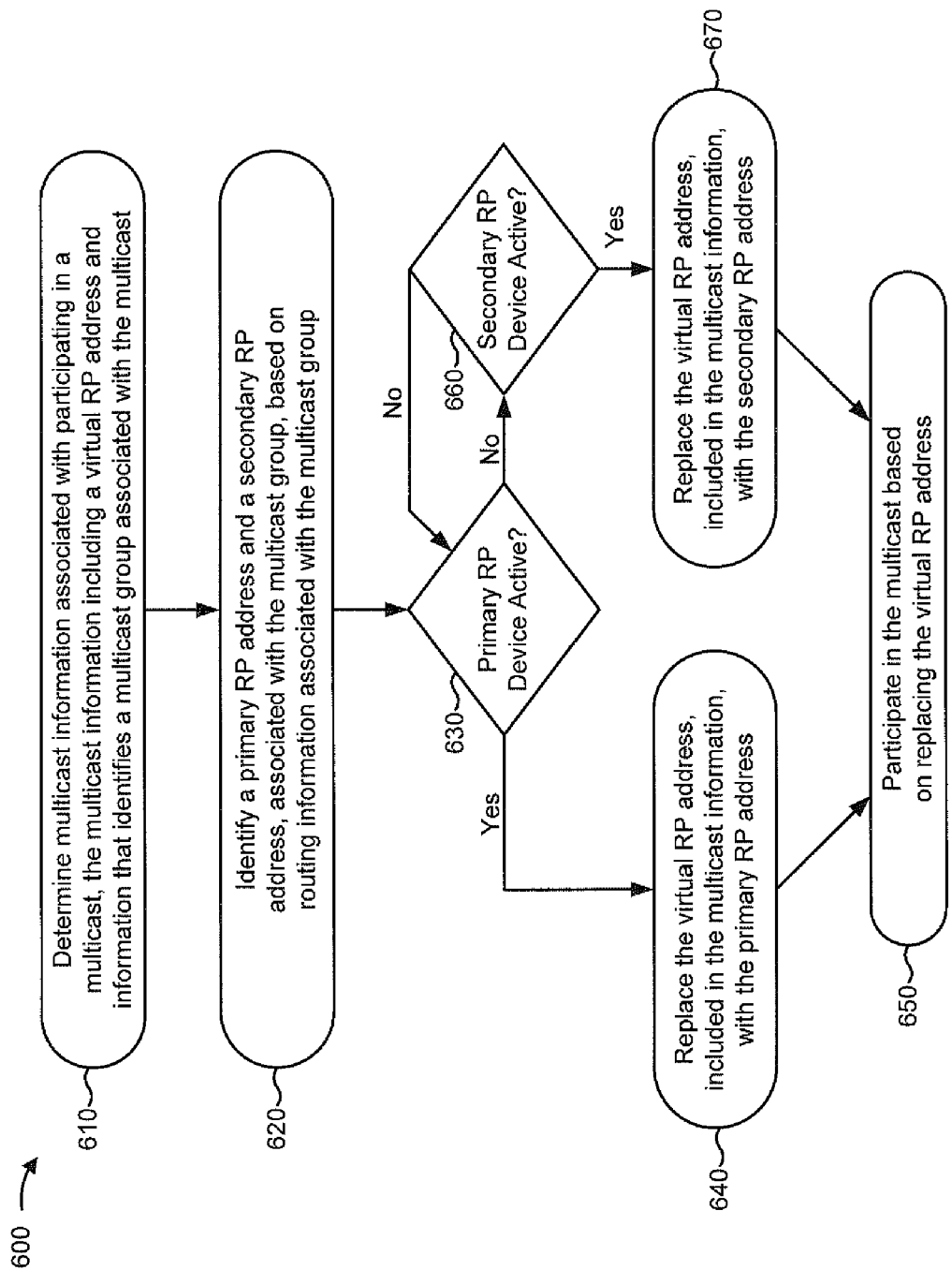

VIRTUAL RENDEZVOUS POINT (RP) ADDRESS FOR MULTICAST RP DEVICE

BACKGROUND

A multicast is a communication between a source device and multiple destination devices via a network. In a multicast, the source device transmits information (e.g., a message, a data packet, etc.) to the multiple destination devices in a single transmission. In some cases, the source device may provide the information to a rendezvous point (RP) device (e.g., without knowing information that identifies the multiple destination devices), and the multiple destination devices may receive the information from the RP device (e.g., by joining a multicast group associated with the RP device).

BRIEF DESCRIPTION OF THE DRAWINGS

FIG. 6 is a flow chart of an example process for identifying an active rendezvous point device and replacing a virtual rendezvous point address with an address that identifies the active rendezvous point device.

DETAILED DESCRIPTION

The following detailed description of example implementations refers to the accompanying drawings. The same reference numbers in different drawings may identify the same or similar elements.

Within a network that utilizes multiple rendezvous points (RP), an Auto-RP mechanism may be used to automate distribution of RP information. The Auto-RP mechanism may operate using two components: candidate RPs and mapping agents. The candidate RPs may advertise their willingness to be an RP via announcement messages, which are periodically sent to a first known group address. The RP mapping agents may join the first known group and may assign the candidate RPs to act as an RP for one or more multicast groups. The RP mapping agents may then advertise the RP assignments to a second known group address. Other devices (e.g., protocol independent multicast devices, provider edge devices, etc.) may join the second known group and may receive and store the RP assignments. In this manner, it may be possible to assign multiple RPs to different multicast groups. Similarly, multiple RPs may be assigned to a multicast group for redundancy (e.g., in case of an RP device failure).

As an example, three multicast groups (e.g., group A, group B, and group C) and three available RP devices (e.g., RP1, RP2, and RP3) may be associated with the network. In this example, RP1 may be assigned to group A as a primary RP device and RP2 may be assigned to group A as a secondary RP device. Similarly, RP2 may be assigned to group B as a primary RP device and RP3 may be assigned to group B as a secondary RP device. Finally, RP3 may be assigned to group C as a primary RP device and RP1 may be assigned to group C as a secondary RP device.

When the total number of multicast groups is small, manually configuring RP addresses (e.g., network addresses that identify the RP devices) for each client device (e.g., a source device, a destination device, etc.) included in a multicast group may be manageable. However, as the number of multicast groups increases, and as the number of client devices included in each multicast group increases, additional RP devices may be deployed (e.g., to balance the load of traffic routed to the deployed RP devices). However, increasing the number of RP devices may also cause management of RP address configuration to become time consuming and inefficient. Implementations described herein may allow a client device (e.g., a source device, a destination device) to be configured with a single RP address (e.g., a virtual RP address) and participate in multicasts associated with multiple multicast groups, rather than requiring the client device to be configured with multiple RP addresses associated with the multiple multicast groups. In this way, management of RP address configuration for all client devices may be simplified.

Figure 1A:
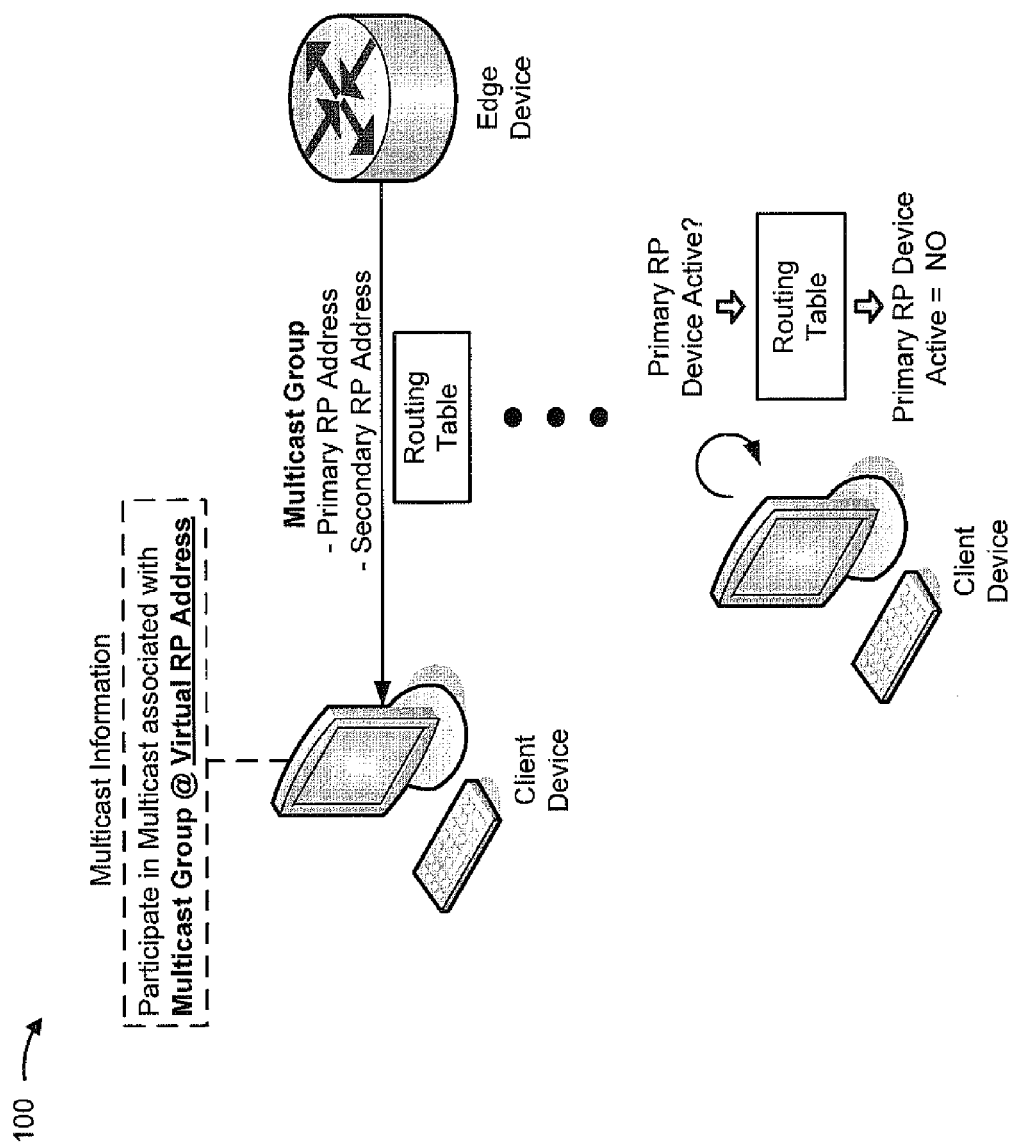
FIGS. 1A and 1B are diagrams of an overview of an example implementation described herein.
Figure 1B:
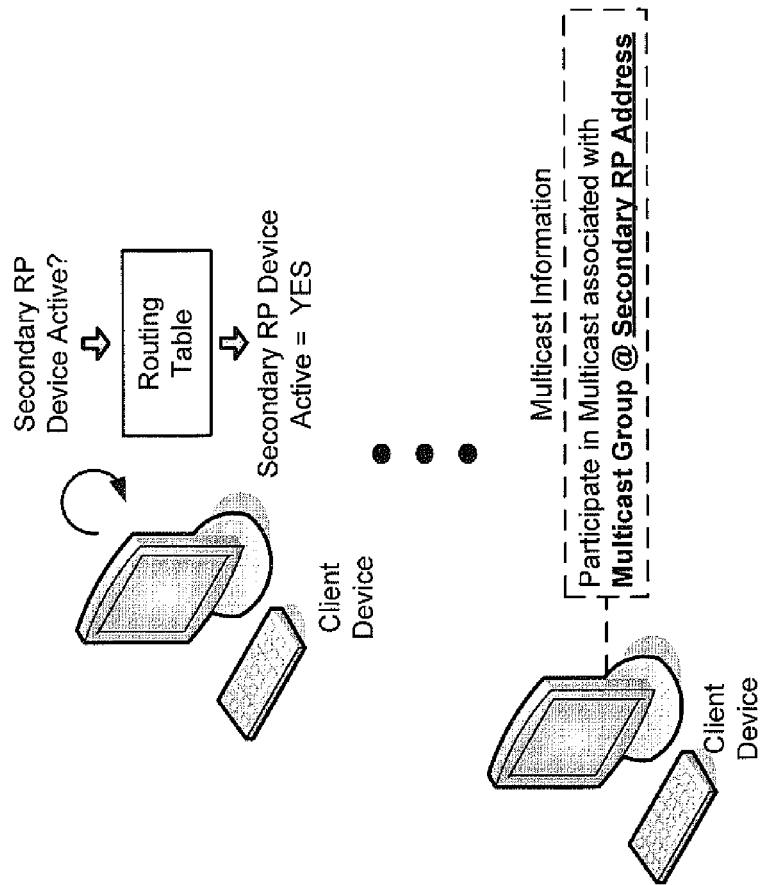

FIGS. 1A and 1B are diagrams of an overview of an example implementation 100 described herein. For the purposes of example implementation 100, assume that a client device (e.g., a source device or a destination device) wishes to participate in a multicast via a network. For example, a source device may participate in a multicast by providing data to a multicast group via the network. As another example, a destination device may participate in the multicast by joining the multicast group associated with receiving the data provided to the multicast group. Further, assume that an edge device, associated with the client device, stores routing information that includes a primary RP address associated with the multicast group, a secondary RP address associated with the multicast group, and a routing table associated with the network, and that the edge device sends the routing information to the client device.

As shown in FIG. 1A, the client device may determine multicast information associated with participating in the multicast. As shown, the multicast information may identify the multicast group associated with the multicast, and may include a virtual RP address, stored by the client device, that acts as a place holder RP device address. As further shown, the client device may determine (e.g., based on the routing information stored by the edge device and provided to the client device), a primary RP address and a secondary RP address associated with the multicast group. As further shown, the client device may receive the primary RP address, and may determine (e.g., based on the routing table stored by the edge device), that a primary RP device, identified by the primary RP address, is not active.

As shown in FIG. 1B, since the primary RP device associated with the multicast group is not active, the client device may then determine whether a secondary RP device, identified by the secondary RP address, is active. As shown, the client device may determine that the secondary RP device is active. As further shown, the client device may replace the virtual RP address, included in the multicast information, with the secondary RP address (i.e., the active RP address). The client device may then begin participating in the multicast based on the secondary RP address (e.g., by providing data to, or receiving data from, the secondary RP device).

In this way, a client device may be configured with one RP address (e.g., a virtual RP address), rather than requiring the client device to be configured with multiple RP addresses associated with multiple multicast groups. Other client devices, associated with the network, may be configured in a similar manner such that the management of RP address configuration for all client devices is simplified.

Figure 2:
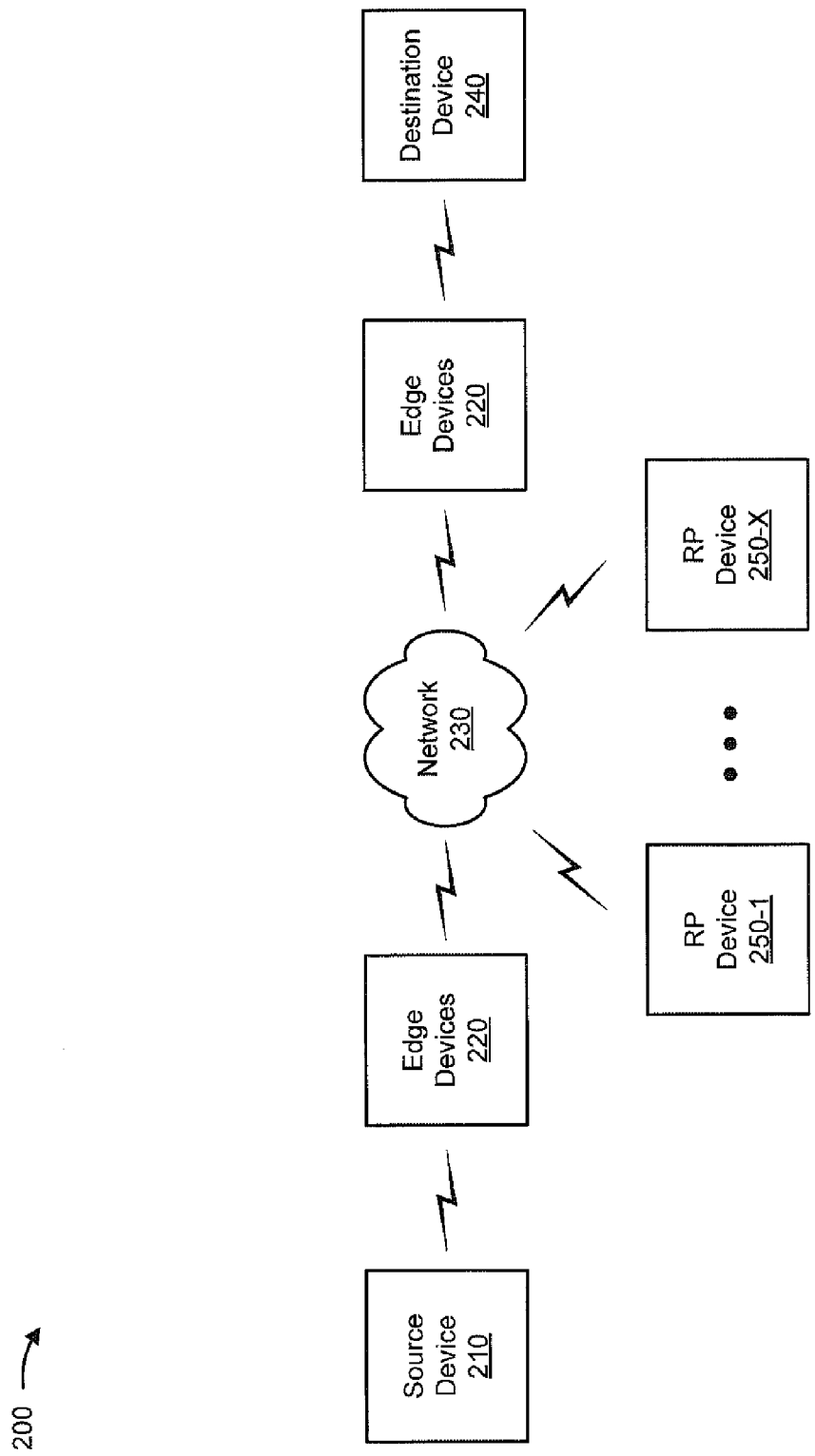
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a source device 210, one or more edge devices 220, a network 230, a destination device 240, and a set of RP devices 250-1 through 250-X (X>1) (hereinafter collectively referred to as "RP devices 250," and individually as "RP device 250").

Source device 210 may include a device capable of communicating with other devices (e.g., edge device 220, destination device 240, RP device 250, etc.) via a network (e.g., network 230), and/or capable of receiving information provided by another device (e.g., edge device 220). For example, source device 210 may include a computing device, such as a laptop computer, a tablet computer, a handheld computer, a desktop computer, a mobile phone (e.g., a smart phone, a radiotelephone, etc.), a personal digital assistant, a server device, or a similar device. In some implementations, source device 210 may be capable of participating in a multicast (e.g., via network 230) by providing data to a multicast group (e.g., a group of destination devices 240). Additionally, or alternatively, source device 210 may be capable of receiving, processing, determining, requesting, and/or providing routing information (e.g., a primary RP address, a secondary RP address, a routing table, etc.) associated with participating in the multicast.

Edge device 220 may include a device capable of routing data associated with a multicast. For example, edge device 220 may include one or more data processing and/or data transfer devices, such as a router, a gateway, a modem, a switch, a firewall, a network interface card (NIC), a hub, a bridge, a server, an optical add/drop multiplexer (OADM), or any other type of device that processes and/or transfers data associated with a multicast. In some implementations, edge device 220 may be capable of receiving, determining, processing, storing, and/or providing information that identifies RP device 250 as a primary RP device and/or secondary RP device associated with a multicast group. Additionally, or alternatively, edge device 220 may be capable of receiving, determining, processing, storing, and/or providing a routing table associated with network 230.

Network 230 may include one or more wired and/or wireless networks. For example, network 230 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 230 may support a multicast, associated with a multicast group, between source device 210 and one or more destination devices 240 included the multicast group. Additionally, or alternatively, network 230 may include one or more network devices (e.g., provider edge routers) associated with supporting the multicast. Additionally, or alternatively, network 230 may include one or more RP devices 250. Additionally, or alternatively, one or more devices included in network 230 may be capable of assigning RP devices 250 to one or more multicast groups (e.g., using an Auto-RP mechanism, as described herein) as primary RP devices and/or secondary RP devices.

Destination device 240 may include a device capable of communicating with other devices (e.g., source device 210, edge device 220, RP device 250, etc.) via a network (e.g., network 230), and/or capable of receiving information provided by another device (e.g., edge device 220). For example, destination device 240 may include a computing device, such as a laptop computer, a tablet computer, a handheld computer, a desktop computer, a mobile phone, a personal digital assistant, a server device, or a similar device. In some implementations, destination device 240 may be capable of participating in a multicast (e.g., via network 230) by joining a multicast group configured to receive data provided to the multicast group. Additionally, or alternatively, destination device 240 may be capable of receiving, processing, determining, requesting, and/or providing routing information (e.g., a primary RP address, a secondary RP address, a routing table, etc.) associated with participating in the multicast.

RP device 250 may include a device capable of acting as a rendezvous point for routing data associated with a multicast. For example, RP device 250 may include one or more data processing and/or data transfer devices, such as a router, a gateway, a modem, a switch, a firewall, a NIC, a hub, a bridge, a server, an OADM, or any other type of device that processes and/or transfers data associated with a multicast. In some implementations, RP device 250 may be capable of acting as an RP device for multicasts associated with multiple multicast groups. Additionally, or alternatively, RP device 250 may be capable of acting as a primary RP device for one or more multicast groups. Additionally, or alternatively, RP device 250 may be capable of acting as a secondary RP device for one or more multicast groups. In some implementations, network 230 may include multiple RP devices 250.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
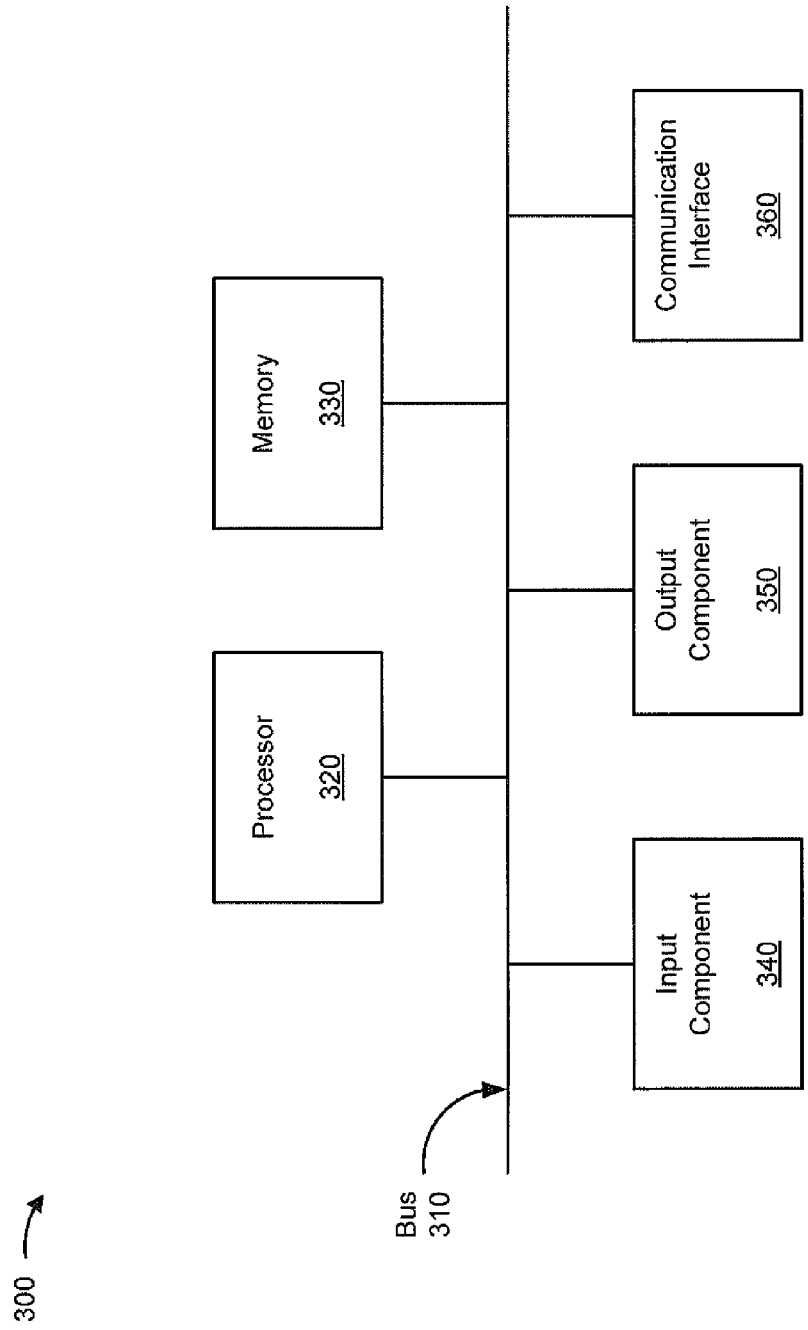
FIG. 3 is a diagram of example components of one or more devices of FIG. 2.

FIG. 3 is a diagram of example components of a device 300. Device 300 may correspond to source device 210, edge device 220, destination device 240, and/or RP device 250. Additionally, or alternatively, each of source device 210, edge device 220, destination device 240, and/or RP device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
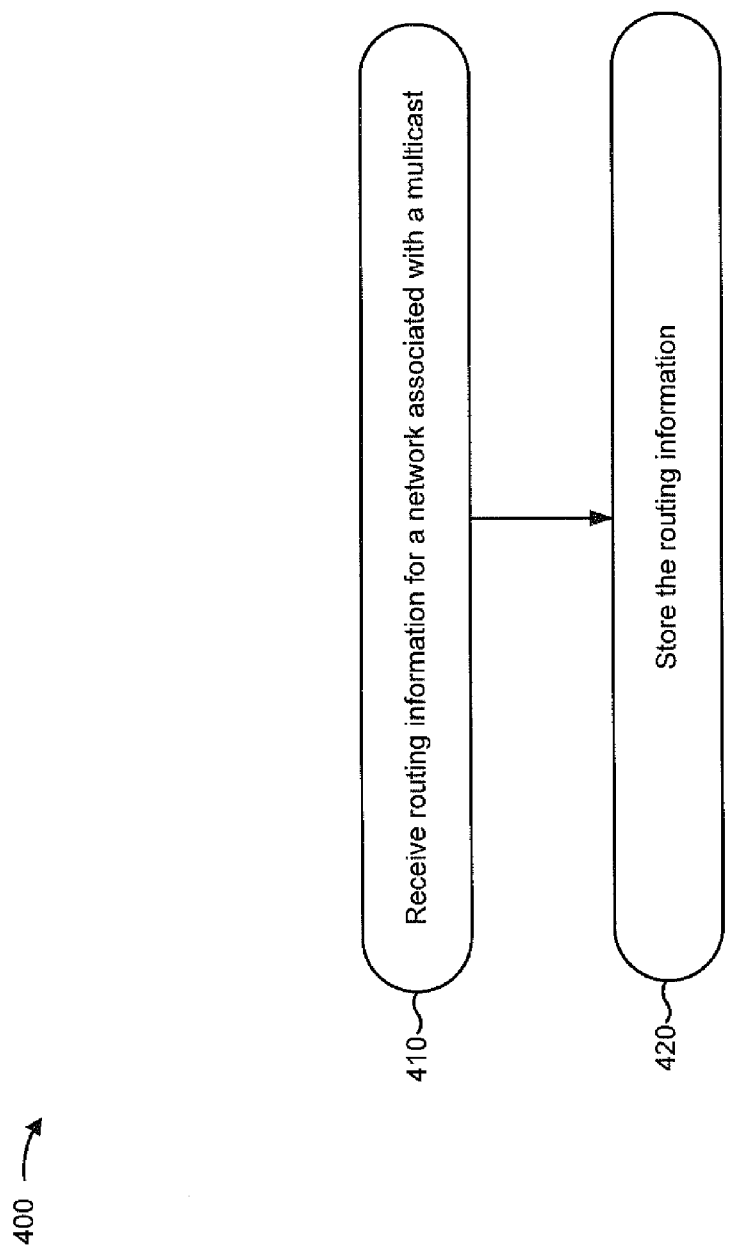
FIG. 4 is a flow chart of an example process for receiving and storing routing information associated with a multicast group.

FIG. 4 is a flow chart of an example process 400 for receiving and storing routing information associated with a multicast group. In some implementations, one or more process blocks of FIG. 4 may be performed by edge device 220. In some implementations, one or more process blocks of FIG. 4 may be performed by another device or a group of devices separate from or including edge device 220 (e.g., source device 210, destination device 240, RP device 250, etc.).

As shown in FIG. 4, process 400 may include receiving routing information for a network associated with a multicast (block 410). For example, edge device 220 may receive routing information for a network associated with a multicast. In some implementations, edge device 220 may receive the routing information when the routing information is provided by another device, such as RP device 250 or another device (e.g., a provider edge router) included in network 230.

In some implementations, routing information may include information that identifies a primary RP device associated with a multicast group and information that identifies secondary RP device associated with the multicast group. For example, the routing information may include a first network address (e.g., an internet protocol (IP) address, etc.) that identifies a first RP device 250 (e.g., included in network 230) that has been assigned to act as a primary RP device for the multicast group. Similarly, the routing information may include a second network address that identifies a second RP device 250 that has been assigned to act as a secondary RP device for the multicast group. In some implementations, the routing information may include additional network addresses, and each additional network address may identify another RP device 250 (e.g., when multiple secondary RP devices are assigned to a multicast group). In some implementations, the routing information may include information (e.g., a multicast group name, a multicast group number, etc.) that identifies the multicast group associated with the one or more RP devices 250 identified in the routing information. In some implementations, the routing information may include information associated with multiple multicast groups.

Additionally, or alternatively, the routing information may include a routing table associated with network 230. For example, the routing information may include information (e.g., a list, a table, a data structure, etc.) that describes routes, associated with one or more devices included in network 230, that data may travel to reach other devices (e.g., destination device 240, RP device 250, etc.) associated with network 230. In some implementations, the routing table may indicate whether RP device 250 is active. For example, if the routing table includes route information associated with a first RP device 250, then the first RP device 250 may be identified as active. As an additional example, if the routing table does not include route information associated with a second RP device 250, then the second RP device 250 may be identified as not active. Additionally, or alternatively, the routing table may include an entry (e.g., a flag, a string of characters, etc.) that indicates whether a particular RP device 250 is active or not active.

In some implementations, edge device 220 may receive updated routing information. For example, a device included in network 230 may update the routing information, and the device may provide the updated routing information to edge device 220. In this example, edge device 220 may receive the updated routing information, and may delete (e.g., from a memory location of edge device 220) a previous version of the routing information. In some implementations, edge device 220 may periodically (e.g., every 1 hour, every 24 hours, once a week, etc.) receive updated routing information.

As further shown in FIG. 4, process 400 may include storing the routing information (block 420). For example, edge device 220 may store the routing information. In some implementations, edge device 220 may store the routing information when edge device 220 receives the routing information (e.g., after edge device 220 receives the routing information).

In some implementations, edge device 220 may store the routing information in a memory location (e.g., a RAM, a ROM, a cache, a hard disk, etc.) of edge device 220. Additionally, or alternatively, edge device 220 may provide the routing information to another device for storage.

In some implementations, edge device 220 may store information associated with the routing information, such as a multicast group identifier (e.g., a multicast group name, a multicast group identification number, etc.) that identifies the multicast group associated with the routing information (e.g., such that edge device 220 may determine routing information, associated with the multicast group, based on the multicast group identifier). Additionally, or alternatively, edge device 220 may store a routing table included in the routing information.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5:
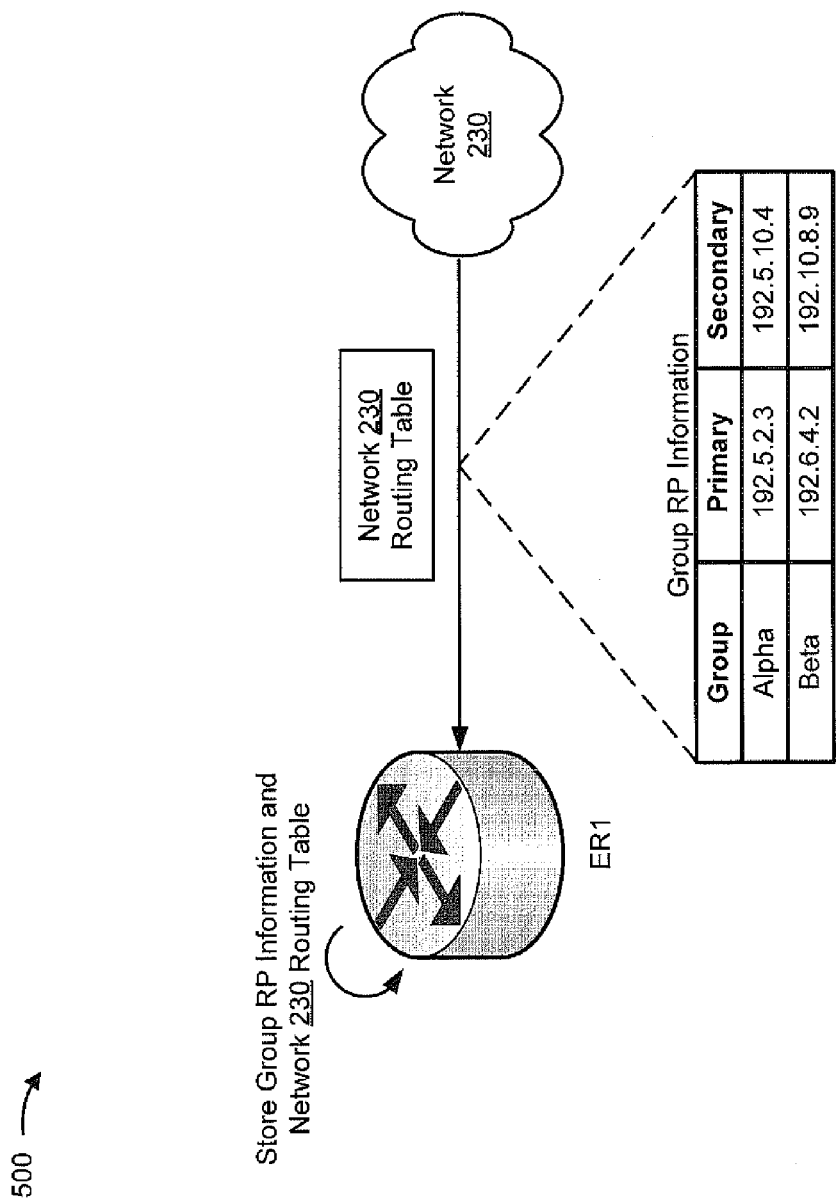
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that one or more devices (e.g., routers, provider edge routers, etc.) included in network 230 are configured to determine and provide routing information to an edge device (e.g., an edge router, ER1) associated with a client device that may participate in a multicast via network 230.

As shown in FIG. 5, network 230 may provide (e.g., via a provider edge router included in network 230) the routing information to ER1. As shown, the routing information may include a first IP address (e.g., 192.5.2.3) that identifies a first RP device 250 that has been assigned to act as a primary RP device for a multicast group identified as group Alpha. Similarly, the routing information may include a second IP address (e.g., 192.5.10.4) that identifies a second RP device 250 that has been assigned to act as a secondary RP device for group Alpha.

As also shown, the routing information may include a third IP address (e.g., 192.6.4.2) that identifies a third RP device 250 that has been assigned to act as a primary RP device for a multicast group identified as group Beta. Similarly, the routing information may include a fourth IP address (e.g., 192.10.8.9) that identifies a fourth RP device 250 that has been assigned to act as a secondary RP device for group Beta. As further shown, the routing information may include a routing table associated with network 230. The routing information may also include routing information associated with additional multicast groups (not shown).

As further shown in FIG. 5, ER1 may receive the routing information (e.g., the group RP address information and the routing table), and ER1 may store (e.g., in a memory location of ER1), the routing information.

As indicated above, FIG. 5 is provided merely as an example. Other examples are possible and may differ from what was described with regard to FIG. 5.

FIG. 6 is a flow chart of an example process 600 for identifying an active rendezvous point device and replacing a virtual rendezvous point address with an address that identifies the active rendezvous point device. In some implementations, one or more process blocks of FIG. 6 may be performed by source device 210. Alternatively, one or more process blocks of FIG. 6 may be performed by destination device 240. Additionally, or alternatively, one or more process blocks of FIG. 6 may be performed by a device other than source device 210 and destination device 240, such as edge device 220.

As shown in FIG. 6, process 600 may include determining multicast information associated with participating in a multicast, the multicast information including a virtual RP address and information that identifies a multicast group associated with the multicast (block 610). For example, source device 210 may determine multicast information associated with participating in a multicast by providing data to a multicast group. As an additional example, destination device 240 may determine multicast information associated with participating in a multicast by receiving data provided to the multicast group).

In some implementations, source device 210 may determine the multicast information when a user of source device 210 provides information (e.g., user input) indicating that source device 210 is to participate in the multicast. Similarly, destination device 240 may determine the multicast information when a user of destination device 240 provides information (e.g., user input) indicating that destination device 240 is to participate in the multicast.

Multicast information may include information associated with participating in a multicast. For example, the multicast information may be included in a script associated with registering to participate in the multicast. In some implementations, the multicast information may include a virtual RP address associated with source device 210 and/or destination device 240. A virtual RP address may include a generic network address, associated with source device 210 and/or destination device 240, that acts as a placeholder for an active RP address that is to be determined at a later time. For example, the virtual RP address may include a generic network address (e.g., 1.1.1.1), known by source device 210 and destination device 240, that acts as a placeholder in the script that is to be replaced with an address associated with an active RP device 250, as discussed below. In some implementations, source device 210 and destination device 240 may receive (e.g., from a device included in network 230, from user input, etc.) the virtual IP address, and source device 210 and destination device 240 may store (e.g. in a memory location) the virtual RP address. In some implementations, the virtual RP address may be identical across multiple multicast groups, multiple source devices 210, and/or multiple destination devices 240.

Additionally, or alternatively, the multicast information may include information (e.g., a multicast group name, a multicast group identification number, etc.) that identifies a multicast group associated with the multicast. For example, multicast information determined by source device 210 may include one or more multicast group names that identify one or more corresponding multicast groups to which source device 210 is to provide data. As another example, multicast information determined by destination device 240 may include a multicast group name that identifies a multicast group that destination device 240 is to join (e.g., such that destination device 240 may receive data that is provided to the multicast group).

As further shown in FIG. 6, process 600 may include identifying a primary RP address and a secondary RP address, associated with the multicast group, based on routing information associated with the multicast group (block 620). For example, source device 210 may identify a primary RP address and a secondary RP address, associated with the multicast group, based on routing information associated with the multicast group. As another example, destination device 240 may identify a primary RP address and a secondary RP address, associated with the multicast group, based on routing information associated with the multicast group. Henceforth, block 620 is described as being performed by source device 210. However, the processes and/or methods of block 620 may be equally performed by destination device 240.

In some implementations, source device 210 may identify the primary RP address and the secondary RP address when source device 210 determines the multicast information associated with participating in the multicast. Additionally, or alternatively, source device 210 may identify the primary RP address and the secondary RP address when source device 210 receives routing information from another device, such as edge device 220 (e.g., after source device 210 receives the routing information).

A primary RP address may include a network address (e.g., an IP address) that identifies a first RP device 250 that is to act as a primary RP device for a multicast associated with a multicast group. A secondary RP address may include a network address that identifies a second RP device 250 that is to act as a secondary (e.g., backup, alternate, etc.) RP device for a multicast associated with a multicast group. In some implementations, the secondary RP device 250, assigned to the multicast group, may be used as a rendezvous point only when the primary RP device 250, assigned to the multicast group, is not active (e.g., unavailable, powered off, offline, unreachable, experiencing an error, etc.).

In some implementations, source device 210 may identify the primary RP address and the secondary RP address based on routing information, associated with network 230, provided by edge device 220. For example, source device 210 may determine that source device 210 is to participate in a multicast associated with a particular multicast group, and source device 210 may execute a script that sends, to edge device 220, a request to provide the primary RP address and the secondary RP associated with the multicast group. In this example, edge device 220 may receive the request, may determine (e.g., based on the routing information stored by edge device 220) the primary RP address and the secondary RP address, may provide the primary RP address and the secondary RP address to source device 210, and source device 210 may identify the primary RP address and the secondary RP address, associated with the multicast group, based on receiving the primary RP and the secondary RP address from edge device 220.

As further shown in FIG. 6, process 600 may include determining whether a primary RP device, identified by the primary RP address, is active (block 630). For example, source device 210 may determine whether a primary RP device 250, identified by the primary RP address, is active. As another example, destination device 240 may determine whether a primary RP device 250, identified by the primary RP address, is active. Henceforth, block 630 is described as being performed by source device 210. However, the processes and/or methods of block 630 may be equally performed by destination device 240.

In some implementations, source device 210 may determine whether the primary RP device 250 is active based on routing information, associated with network 230, provided by edge device 220. For example, source device 210 may identify the primary RP address, associated with participating in the multicast, and source device 210 may execute a script that sends, to edge device 220, a request to provide a routing table associated with network 230. In this example, edge device 220 may receive the request, may determine (e.g., based on the routing information stored by edge device 220) the routing table, and may provide the routing table to source device 210.

In some implementations, source device 210 may receive the routing table, and may determine, based on information included in the routing table, whether the primary RP device 250, associated with the primary RP address, is active. For example, source device 210 may determine that the primary RP device 250 is active based on locating the primary RP address, associated with the primary RP device 250, in the routing table (e.g., when the routing table includes only addresses associated with active RP devices 250 and does not include addresses associated with inactive RP devices 250). Additionally, or alternatively, source device 210 may determine whether the primary RP device 250 is active based on an indication (e.g., a flag, a notification, etc.), included in the routing table, that indicates whether the primary RP device 250 is active.

As further shown in FIG. 6, if the primary RP device is active (block 630—YES), then process 600 may include replacing the virtual RP address, included in the multicast information, with the primary RP address (block 640). For example, source device 210 may determine that the primary RP device 250, associated with the multicast group, is active, and source device 210 may replace the virtual RP address, included in the multicast information, with the primary RP address. As another example, destination device 240 may determine that the primary RP device 250, associated with the multicast group, is active, and destination device 240 may replace the virtual RP address, included in the multicast information, with the primary RP address. Henceforth, block 640 is described as being performed by source device 210. However, the processes and/or methods of block 640 may be equally performed by destination device 240.

In some implementations, replacing the virtual RP address (e.g., included in the multicast information) with the primary RP address may allow source device 210 to participate in the multicast. For example, as stated above, the multicast information may be included in a script associated with registering to participate in the multicast. In this example, source device 210 may replace the virtual RP address, included in the multicast information associated with the script, with the primary RP address (e.g., since the primary RP device 250 is active), and the script may be executed to allow source device 210 to participate in the multicast via the primary RP device 250 identified by the primary RP address. In some implementations, source device 210 may automatically (e.g., without user intervention) replace the virtual RP address, included in the multicast information, with the primary RP address.

In some implementations, source device 210 may replace the virtual RP address associated with a first multicast group, and source device 210 may identify a primary RP address and a secondary RP address associated with a second multicast group, as described in block 620. For example, the multicast information may indicate that source device 210 is to provide data to a first multicast group and a second multicast group. In this example, source device 210 may determine that a first primary RP device 250, associated with the first multicast group, is active, may replace the virtual RP address with a primary RP address that identifies the first primary RP device 250, and may proceed with identifying a second primary RP address and a second secondary RP address associated with the second multicast group. In this way, source device 210 may provide the data to more than one multicast group.

As further shown in FIG. 6, process 600 may include participating in the multicast based on replacing the virtual RP address (block 650). For example, source device 210 may participate in the multicast by providing the data to the multicast group via RP device 250 identified by the RP address (e.g., the primary RP address, the secondary RP address) used to replace the virtual RP address (e.g., included in the script associated with initiating participation in the multicast). As another example, destination device 240 may participate in the multicast by joining the multicast group associated with the RP device 250 identified by the RP address (e.g., the primary RP address, the secondary RP address) used to replace the virtual RP address.

In this way, all source devices 210 and destination devices 240 may be configured with an identical, generic RP address (e.g., the virtual RP address) that may be automatically replaced with an address that identifies an active RP device 250 associated with a multicast. As such, each source device 210 and each destination device 240 need not be individually configured with multiple RP addresses (e.g., multiple primary RP addresses, multiple secondary RP addresses) associated with one or more multicast groups, and the management of RP address configuration for all source devices 210 and destination devices 240 may be simplified.

As further shown in FIG. 6, if the primary RP device is not active (block 630—NO), then process 600 may include determining whether a secondary RP device, identified by the secondary RP address, is active (block 660). For example, source device 210 may determine that the primary RP device 250, associated with the primary RP address, is not active, and source device 210 may determine whether a secondary RP device 250, associated with the secondary RP address, is active. As another example, destination device 240 may determine that the primary RP device 250, associated with the primary RP address, is not active, and destination device 240 may determine whether a secondary RP device 250, associated with the secondary RP address, is active. Henceforth, block 660 is described as being performed by source device 210. However, the processes and/or methods of block 660 may be equally performed by destination device 240.

In some implementations, source device 210 may determine whether the secondary RP device 250 is active based on routing information, associated with network 230, provided by edge device 220. For example, source device 210 may determine whether the secondary RP device 250 is active based on the routing table received from edge device 220, as described with respect to block 630.

In a manner similar to that described above, source device 210 may receive the routing table, and may determine, based on information included in the routing table, whether the secondary RP device 250, associated with the secondary RP address, is active. For example, source device 210 may determine that the secondary RP device 250 is active based on locating the secondary RP address, associated with the secondary RP device 250, in the routing table (e.g., when the routing table includes only addresses associated with active RP devices 250 and does not include addresses associated with inactive RP devices 250). Additionally, or alternatively, source device 210 may determine whether the secondary RP device 250 is active based on an indication (e.g., a flag, a notification, etc.), included in the routing table, that indicates whether the secondary RP device 250 is active.

As further shown in FIG. 6, if the secondary RP device is active (block 660—YES), then process 600 may include replacing the virtual RP address, included in the multicast information, with the secondary RP address (block 670). For example, source device 210 may determine that the secondary RP device 250, associated with the multicast group, is active, and source device 210 may replace the virtual RP address, included in the multicast information, with the secondary RP address. As another example, destination device 240 may determine that the secondary RP device 250, associated with the multicast group, is active, and destination device 240 may replace the virtual RP address, included in the multicast information, with the secondary RP address. Henceforth, block 670 is described as being performed by source device 210. However, the processes and/or methods of block 670 may be equally performed by destination device 240.

In some implementations, replacing the virtual RP address (e.g., included in the multicast information) with the secondary RP address may allow source device 210 to participate in the multicast. For example, as stated above, the multicast information may be included in a script associated with initiating participation in the multicast. In this example, source device 210 may determine that the primary RP device 250 is not active, may determine that the secondary RP device is active, and may replace the virtual RP address, included in the multicast information associated with the script, with the secondary RP address. In this example, the script may be executed to allow source device 210 to participate in the multicast via the secondary RP device 250 identified by the secondary RP address. In some implementations, source device 210 may automatically (e.g., without user intervention) replace the virtual RP address, included in the multicast information, with the secondary RP address.

In some implementations, source device 210 may replace the virtual RP address with the secondary RP address, and source device 210 may participate in the multicast (e.g., via the secondary RP device 250) as described above with respect to block 650. Alternatively, destination device 240 may replace the virtual RP address with the secondary RP address, and destination device 240 may participate in the multicast (e.g., via the secondary RP device 250) as described above with respect to block 650.

As further shown in FIG. 6, if the secondary RP device is not active (block 660—NO), then process 600 may return to block 630. For example, source device 210 may determine that the secondary RP device 250 is not active, and source device 210 may return to block 630 and determine whether the primary RP device 250 is active. As an additional example, destination device 240 may determine that the secondary RP device 250 is not active, and destination device 240 may return to block 630 and determine whether the primary RP device 250 is active. Henceforth, process 600 after block 660—NO is described as being performed by source device 210. However, the processes and/or methods of process 600 after block 660—NO may be equally performed by destination device 240.

In some implementations, source device 210 may continue determining whether the primary RP device 250 or the secondary RP device 250 is active until a threshold is satisfied. For example, source device 210 may determine that the primary RP device is not active at a first time (e.g., 0 seconds), may determine that the secondary RP device is not active at a second time (e.g., 4 seconds), may determine that the primary RP device 250 is not active at a third time (e.g., 7 seconds), and may determine that the secondary RP device is not active at a fourth time (e.g., 10 seconds). In this example, if the threshold amount of time to determine an active RP device 250 is 10 seconds from the first determination, then source device 210 may stop determining whether the primary RP device 250 or the secondary RP device 250 is active (e.g., since the threshold amount of time, 10 seconds, is satisfied).

Additionally, or alternatively, source device 210 may continue determining whether the primary RP device 250 or the secondary RP device 250 is active until a threshold amount of attempts has been satisfied (e.g., source device 210 may determine whether the primary RP device 250 or the secondary RP device 250 is active five times before stopping).

In some implementations, source device 210 may provide, to a user, an indication that source device 210 was unable to determine an active RP device 250 (e.g., either primary or secondary), associated with the multicast, when the threshold has been reached.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

FIGS. 7A-7E are diagrams of an example implementation 700 relating to example process 600 shown in FIG. 6. For the purposes of example implementation 700, assume that a user of a source device, SD1, wishes for SD1 to participate in a multicast by providing data to two multicast groups, group Alpha and group Beta. Further, assume that SD1 is configured to execute a script, associated with registering to participate in the multicast, and that the script includes a virtual RP address, 1.1.1.1. Finally, assume that an edge device (e.g., an edge router, ER1), associated with SD1, stores routing information associated with a network through which multicast data will be provided.

Figure 7A:
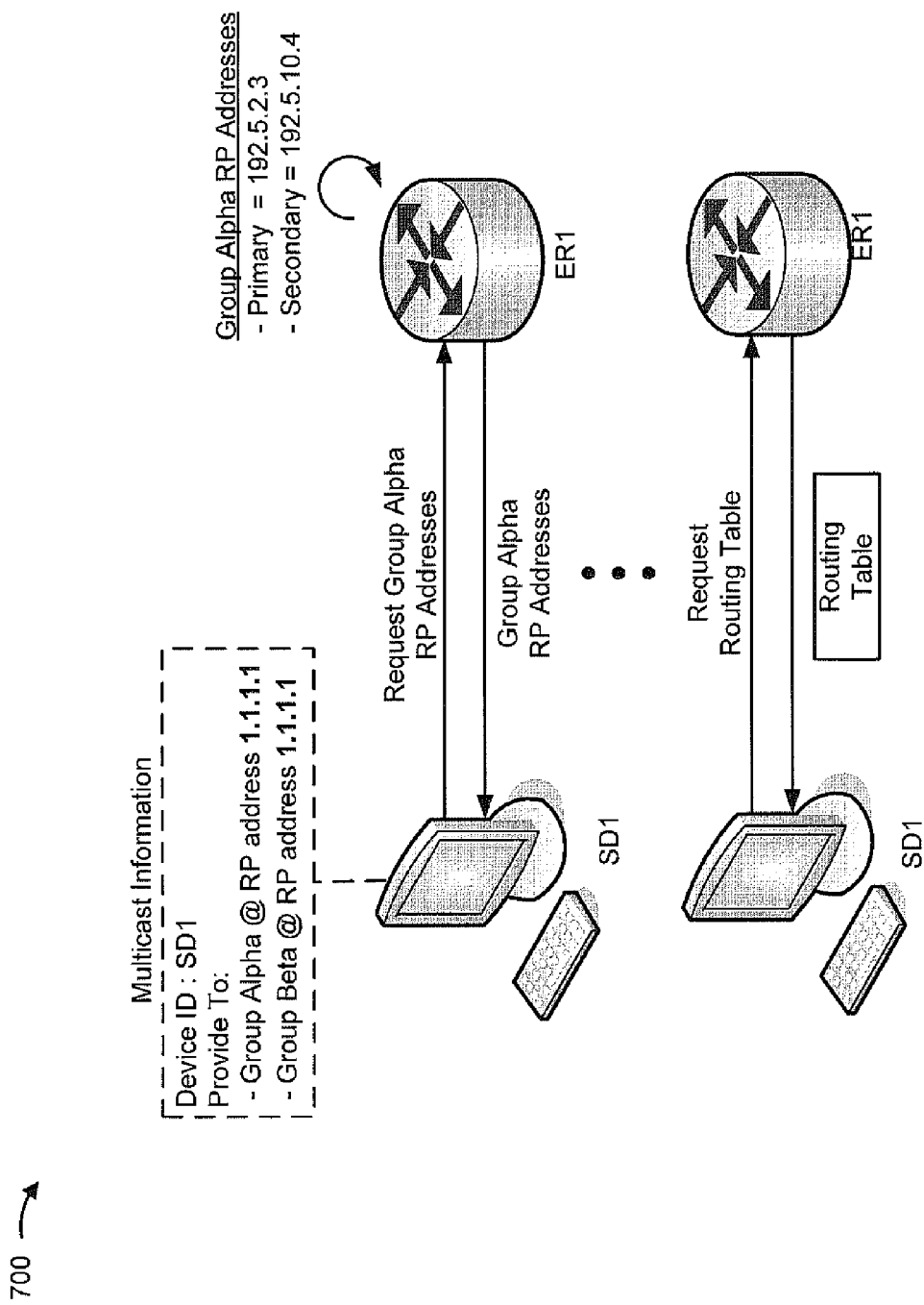
FIGS. 7A-7E are diagrams of an example implementation relating to the example process shown in FIG. 4.

As shown in FIG. 7A, SD1 may determine (e.g., based on the script, based on user input, etc.) multicast information, associated with the multicast. As shown, the multicast information may include information that identifies SD1 (e.g., Device ID: SD1), information that identifies a first multicast group associated with the multicast and the virtual RP address (e.g., Provide to: group Alpha @ 1.1.1.1), and information that identifies a second multicast group associated with the multicast and the virtual RP address (e.g., Provide to: group Beta @ 1.1.1.1). Notably, in FIG. 7A, the multicast information indicates that, for group Alpha and group Beta, the multicast data is to be provided to the virtual RP address.

As further shown in FIG. 7A, SD1 may determine the multicast information, and may send, to ER1, a request to provide a primary RP address and a secondary RP address associated with group Alpha. As shown, ER1 may receive the request, may determine (e.g., based on routing information stored by ER1) a primary RP address (e.g., 192.5.2.3) and a secondary RP address (e.g., 192.5.10.4) associated with group Alpha, and may provide the primary RP address and the secondary RP address to SD1. As further shown, SD1 may also send, to ER1, a request to provide a routing table associated with the network. As shown, ER1 may receive the request, may determine (e.g., based on routing information stored by ER1) the routing table, and may provide the routing table to SD1.

Figure 7B:
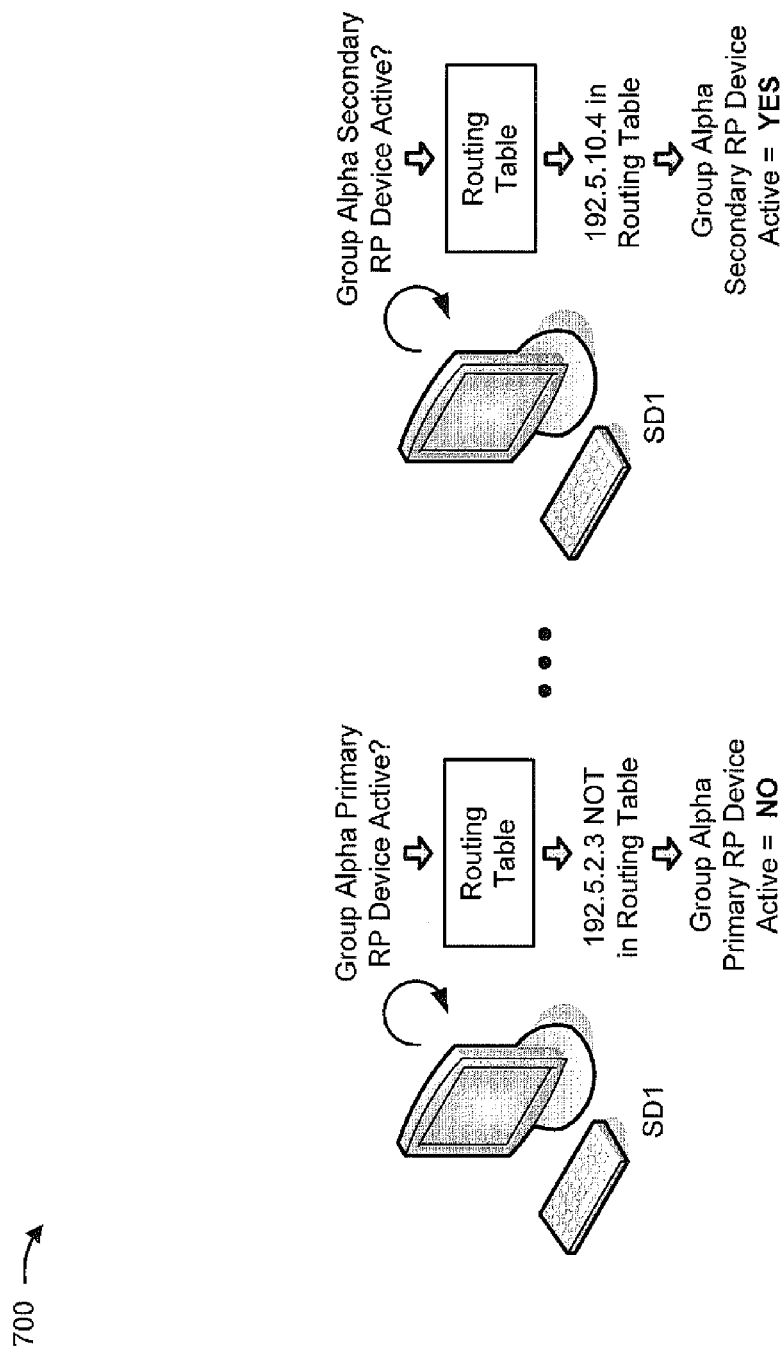

As shown in FIG. 7B, SD1 may receive the routing table, may determine that the primary RP address, 192.5.2.3, is not included in the routing table, and may determine that a primary RP device 250 for group Alpha, identified by the primary RP address, is not active (e.g., since 192.5.2.3 is not included in the routing table). As further shown, SD1 may determine that the secondary RP address, 192.5.10.4, is included in the routing table, and may determine that a secondary RP device 250 for group Alpha, identified by the secondary RP address, is active (e.g., since 192.5.10.4 is included in the routing table).

Figure 7C:
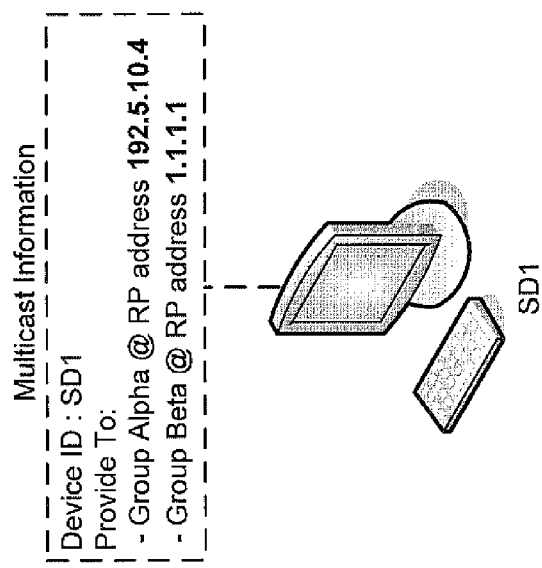

As shown in FIG. 7C, SD1 may replace the virtual RP address, included in the multicast information associated with group Alpha, with the secondary RP address that identifies the secondary RP device 250 associated with group Alpha (e.g., since the primary RP device 250 associated with group Alpha is not active and the secondary RP device 250 associated with group Alpha is active).

Figure 7D:
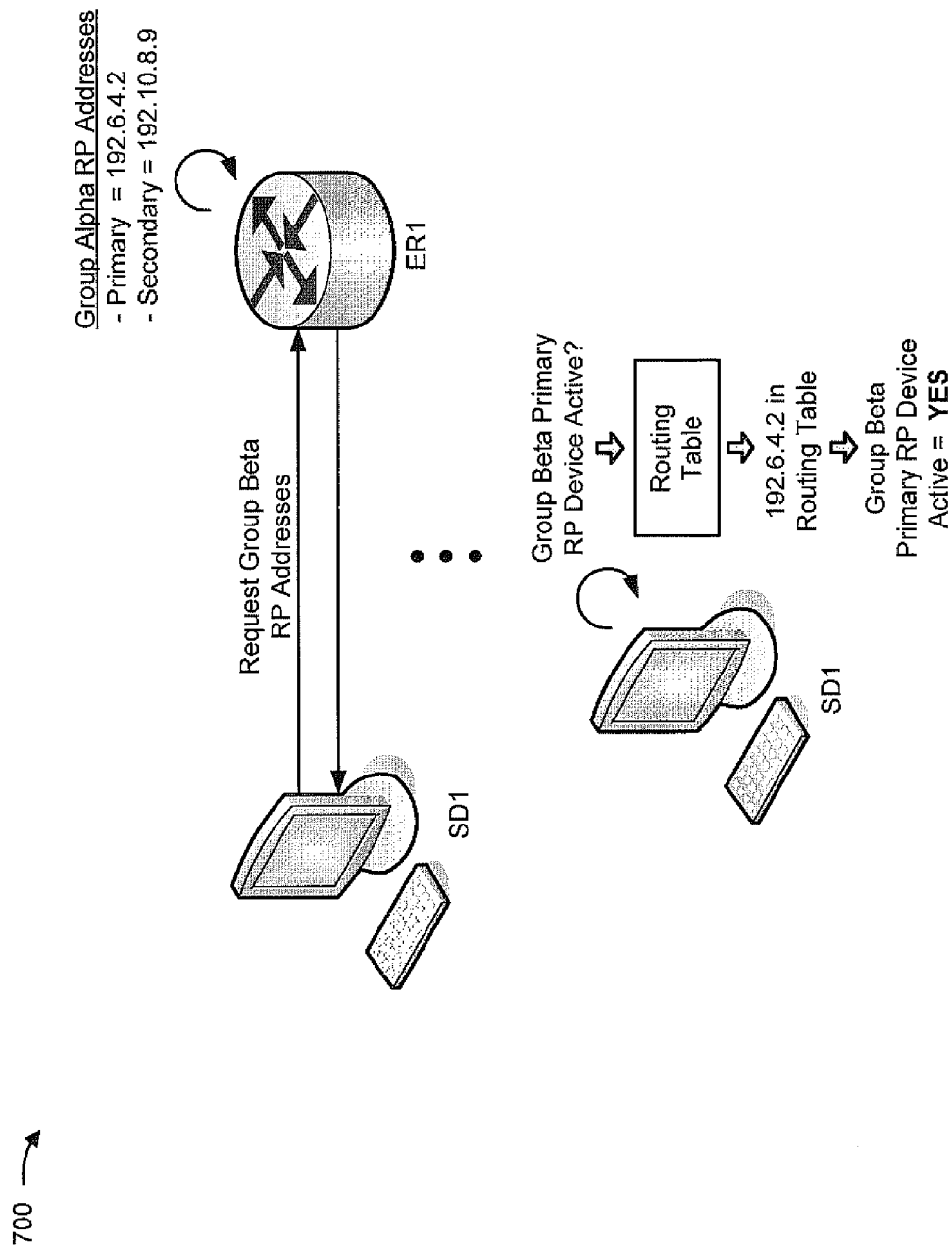

As shown in FIG. 7D, may send, to ER1, a request to provide a primary RP address and a secondary RP address associated with group Beta. As shown, ER1 may receive the request, may determine (e.g., based on routing information stored by ER1) a primary RP address (e.g., 192.6.4.2) and a secondary RP address (e.g., 192.10.8.9) associated with group Beta, and may provide the primary RP address and the secondary RP address to SD1. As further shown, SD1 may determine (e.g., based on the routing table) that the primary RP address, 192.6.4.2, is included in the routing table, and may determine that a primary RP device 250 for group Beta, identified by the primary RP address, is active (e.g., since 192.6.4.2 is included in the routing table).

Figure 7E:
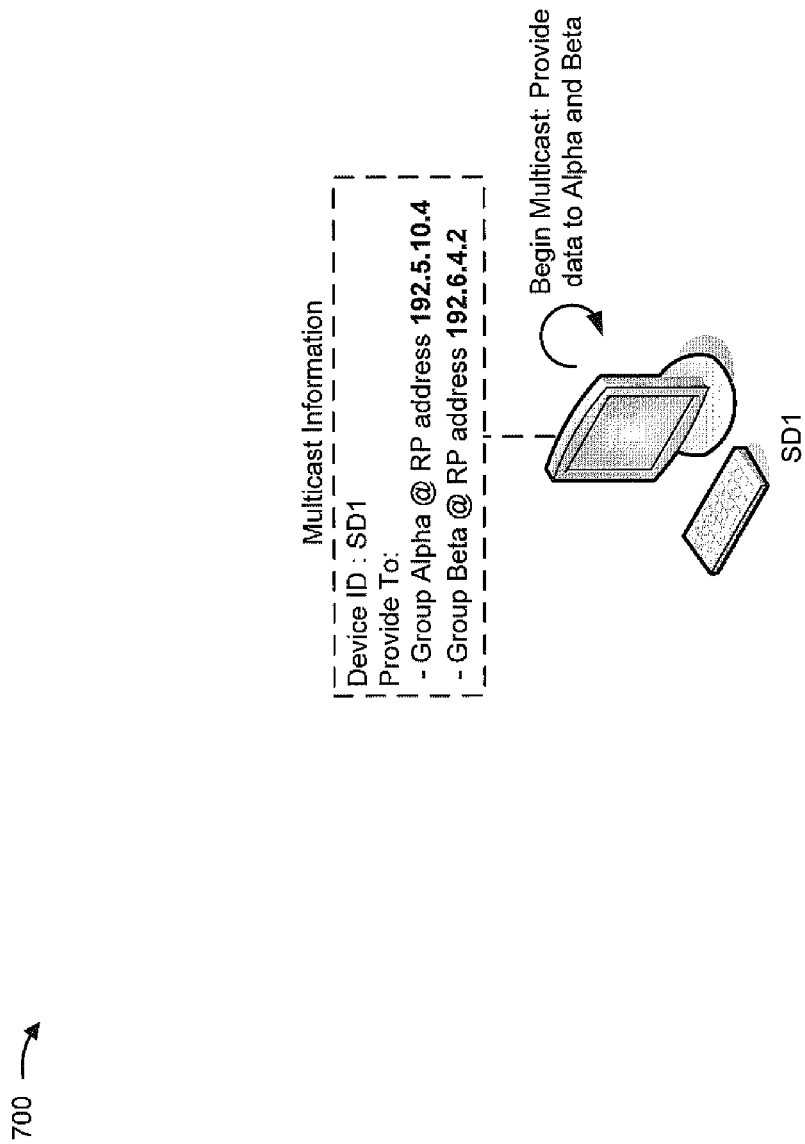

As shown in FIG. 7E, SD1 may replace the virtual RP address, included in the multicast information associated with group Beta, with the primary RP address that identifies the primary RP device 250 associated with group Beta (e.g., since the primary RP device 250 associated with group Beta is active). As further shown, SD1 may participate in the multicast by providing data to the group Alpha secondary RP device address (e.g., 192.5.10.4) and to the group Beta primary RP device address (e.g., 192.6.4.2). In this way, SD1 may need only store a single virtual RP address to initiate participation in the multicast (e.g., rather than requiring SD1 to store the primary RP address and/or the secondary RP address associated with group Alpha and/or group Beta).

While FIGS. 7A-7E are described in terms of certain operations being performed for group Alpha followed by certain operations being performed for group Beta, the operations performed for group Beta may be performed before the operations for group Alpha are performed. Alternatively, the operations for group Alpha and the operations for group Beta may be performed concurrently. As indicated above, FIGS. 7A-7E is provided merely as an example. Other examples are possible and may differ from what was described with regard to FIGS. 7A-7E.

Figure 8A:
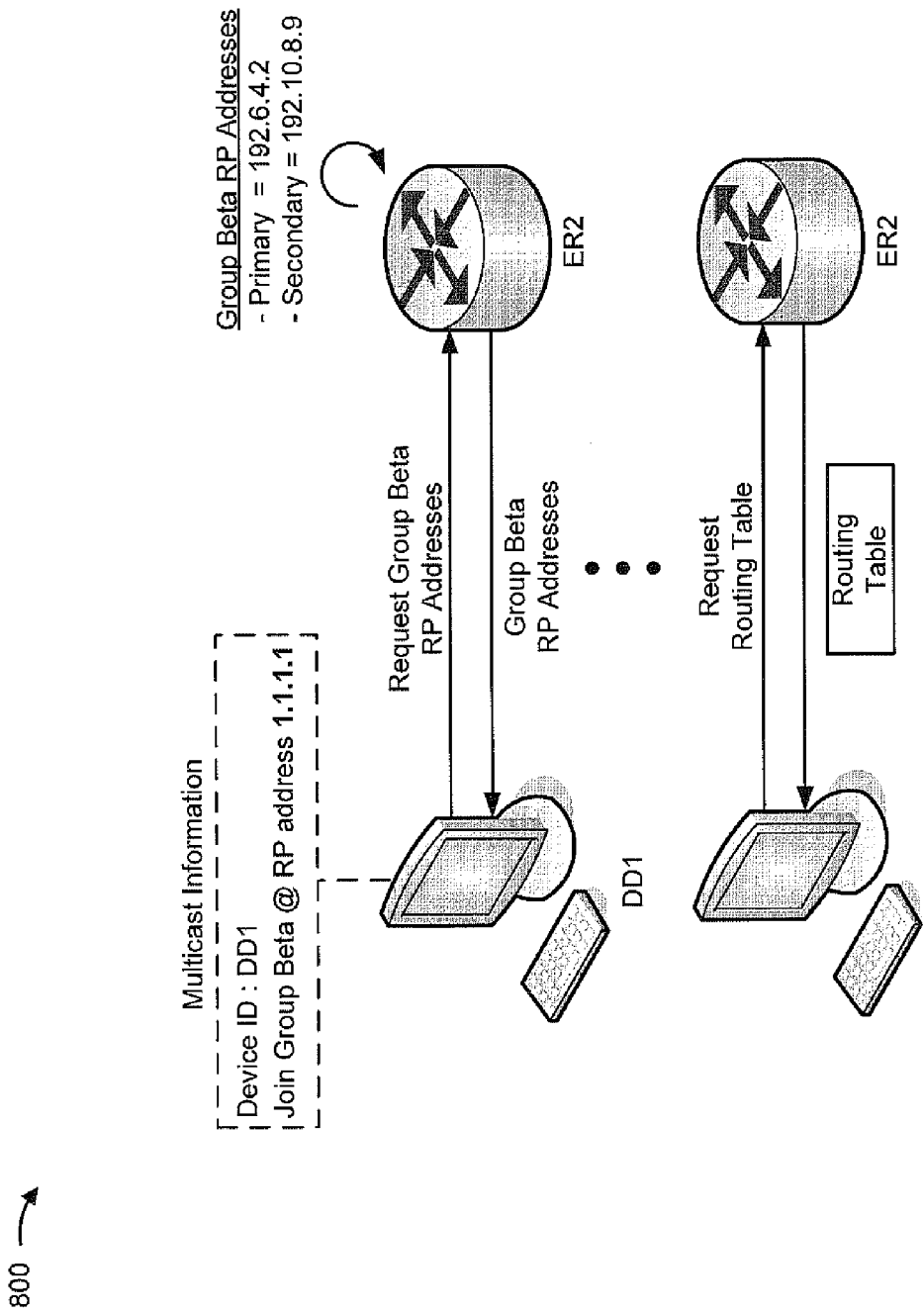
FIGS. 8A and 8B are diagrams of an additional example implementation relating to the example process shown in FIG. 7.
Figure 8B:
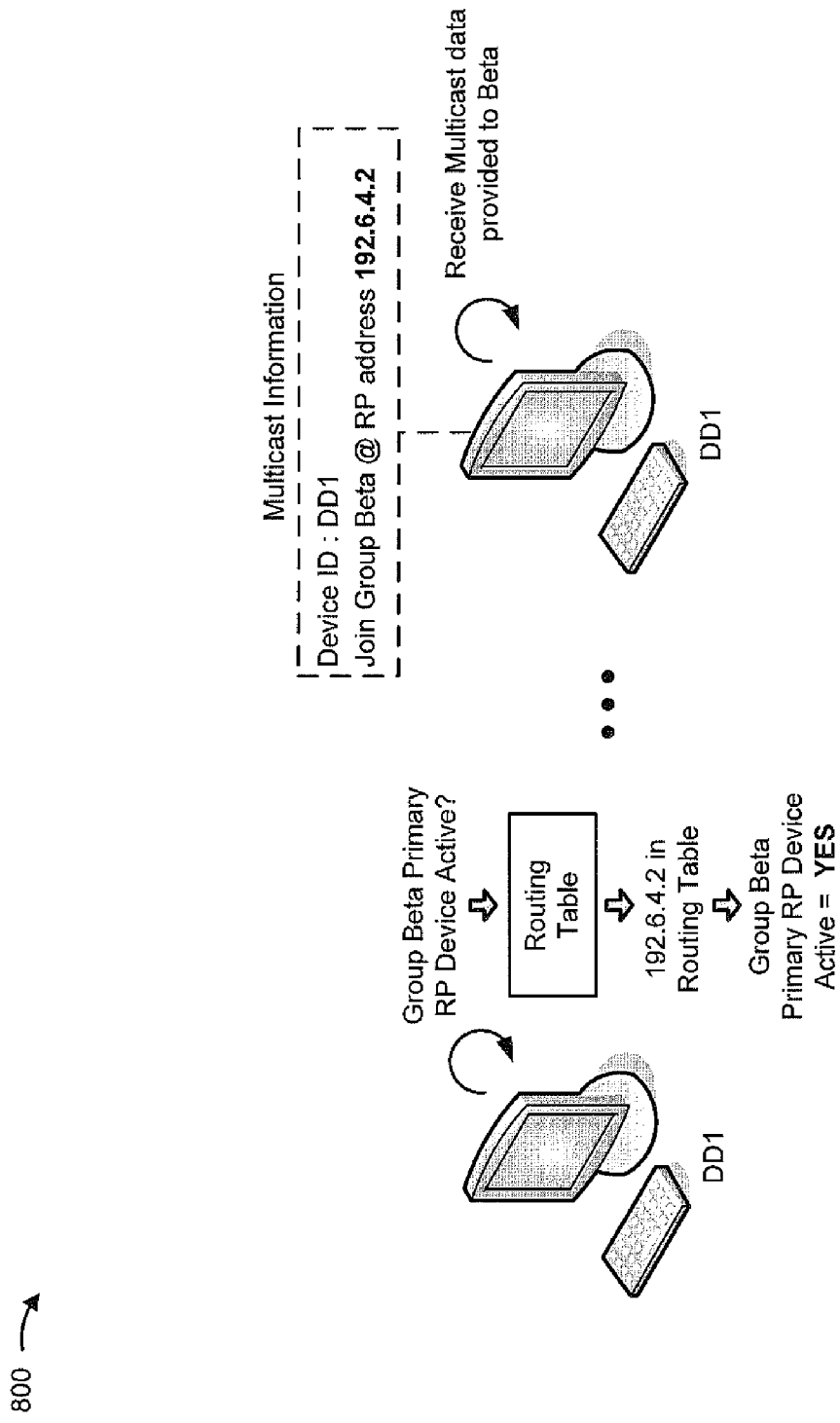

FIGS. 8A and 8B are diagrams of an additional example implementation 800 relating to example process 600 shown in FIG. 6. For the purposes of example implementation 800, assume that a user of a destination device, DD1, wishes for DD1 to participate in a multicast by joining a multicast group, group Beta. Further, assume that DD1 is configured to execute a script, associated with registering to participate in the multicast, and that the script includes a virtual RP address, 1.1.1.1. Finally, assume that an edge device (e.g., an edge router, ER2), associated with DD1, stores routing information from a network through which DD1 will receive multicast data.

As shown in FIG. 8A, DD1 may determine (e.g., based on the script, based on user input, etc.) multicast information, associated with the multicast. As shown, the multicast information may include information that identifies DD1 (e.g., Device ID: DD1), information that identifies the multicast group associated with the multicast and the virtual RP address (e.g., Join: group Beta @ 1.1.1.1). Notably, in FIG. 8A, the multicast information indicates that, for group Beta, the multicast data is to be received via the virtual RP address.

As further shown in FIG. 8A, DD1 may determine the multicast information, and may send, to ER2, a request to provide a primary RP address and a secondary RP address associated with group Beta. As shown, ER2 may receive the request, may determine (e.g., based on routing information stored by ER2) a primary RP address (e.g., 192.6.4.2) and a secondary RP address (e.g., 192.10.8.9) associated with group Beta, and may provide the primary RP address and the secondary RP address to DD1. As further shown, DD1 may also send, to ER2, a request to provide a routing table associated with the network. As shown, ER2 may receive the request, may determine (e.g., based on routing information stored by ER2) the routing table, and may provide the routing table to DD1.

As shown in FIG. 8B, DD1 may receive the routing table, may determine that the primary RP address, 192.6.4.2, is included in the routing table, and may determine that a primary RP device 250 for group Beta, identified by the primary RP address, is active (e.g., since 192.6.4.2 is included in the routing table).

As further shown in FIG. 8B, DD1 may replace the virtual RP address, included in the multicast information associated with group Beta, with the primary RP address that identifies the primary RP device 250 associated with group Beta (e.g., since the primary RP device 250 associated with group Beta is active). As further shown, DD1 may participate in the multicast by joining group Beta and receiving multicast data via the group Beta primary RP device address (e.g., 192.6.4.2). In this way, DD1 may need only store a virtual RP address to initiate participation in the multicast (e.g., rather than requiring DD1 to store the primary RP address and/or the secondary RP address associated with all multicast groups that the user of DD1 may wish to join).

As indicated above, FIGS. 8A and 8B are provided merely as an example. Other examples are possible and may differ from what was described with regard to FIGS. 8A and 8B.

Implementations described herein may allow a client device (e.g., a source device, a destination device) to be configured with a single RP address (e.g., a virtual RP address) and participate in multicasts associated with multiple multicast groups, rather than requiring the client device to be configured with multiple RP addresses associated with the multiple multicast groups. In this way, management of RP address configuration for all client devices may be simplified.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
   determine multicast information associated with participating in a multicast,
   the multicast information including a virtual rendezvous point (RP) address,
   the virtual RP address including a generic network address, associated with at least one of a source device or a destination device, that acts as a placeholder that is to be replaced with information that identifies an active RP device that is to be determined at a later time,
   the device being the source device or the destination device, and
   the multicast information identifying a multicast group associated with the multicast;
   identify a primary RP address and a secondary RP address associated with the multicast group,
   the primary RP address identifying a primary RP device associated with the multicast group, and
   the secondary RP address identifying a secondary RP device associated with the multicast group;
   identify the active RP device,
   the active RP device being the primary RP device or the secondary RP device;
   replace the virtual RP address, included in the multicast information, with the information that identifies the active RP device,
   the information that identifies the active RP device being the primary RP
   address or the secondary RP address; and
   participate in the multicast based on the information that identifies the active RP device.

2. The device of claim 1,
   where the one or more processors are further to:
   receive the virtual RP address; and
   store the virtual RP address based on receiving the virtual RP address; and
   where the one or more processors, when determining the multicast information associated with participating in the multicast, are to:
   determine the multicast information based on the stored virtual RP address.

3. The device of claim 1,
   where the one or more processors are further to:
   receive, from an edge device, first information associated with the primary RP address and second information associated with the secondary RP address; and
   where the one or more processors, when identifying the primary RP address and the secondary RP address associated with the multicast group, are to:

Identify the primary RP address and the secondary RP address based on the first information and the second information received from the edge device.

4. The device of claim 1,
where the one or more processors are further to:
receive a routing table for a network associated with the multicast; and
determine that the primary RP address is included in the routing table; and
where the one or more processors, when identifying the active RP device, are to:
identify the active RP device based on determining that the primary RP address is included in the routing table,
the active RP device being the primary RP device.

5. The device of claim 4, where the one or more processors, when replacing the virtual RP address with the information that identifies the active RP device, are to:
replace the virtual RP address with the primary RP address.

6. The device of claim 1,
where the one or more processors are further to:
receive a routing table for a network associated with the multicast;
determine that the primary RP address is not included in the routing table; and
where the one or more processors, when identifying the active RP device, are to:
identify the active RP device based on determining that the secondary RP address is included in the routing table,
the active RP device being the secondary RP device.

7. The device of claim 6, where the one or more processors, when replacing the virtual RP address with the information that identifies the active RP device, are to:
replace the virtual RP address with the secondary RP address.

8. A non-transitory computer-readable medium storing instructions, the instructions comprising:
one or more instructions that, when executed by one or more processors, cause the one or more processors to:
obtain multicast information associated with providing data to a multicast group,
the multicast information including a virtual rendezvous point (RP) address,
the virtual RP address including a generic network address, associated with at least one of a source device or a destination device, that acts as a placeholder that is to be replaced with an address that identifies an active RP device that is to be determined at a later time,
the source device or the destination device including, the one or more processors, and
the multicast information including information that identifies the multicast group;
determine a primary RP address and a secondary RP address,
the primary RP address and the secondary RP address being associated with the multicast group,
the primary RP address identifying a primary RP device, and
the secondary RP address identifying a secondary RP device;
determine the active RP device,
the active RP device being the primary RP device or the secondary RP device;
replace the virtual RP address, included in the multicast information, with the address that identifies the active RP device,
the address that identifies the active RP device being the primary RP address or the secondary RP address; and
provide data to the multicast group based on the RP address that identifies the active RP device.

9. The non-transitory computer-readable medium of claim 8,
where the one or more instructions, when executed by the one or more processors, further cause the one or more processors to:
receive the virtual RP address; and
store the virtual RP address based on receiving the virtual RP address; and
where the one or more instructions, that cause the one or more processors to obtain the multicast information associated with providing data to the multicast group, cause the one or more processors to:
obtain the multicast information based on the stored virtual RP address.

10. The non-transitory computer-readable medium of claim 8,
where the one or more instructions, when executed by the one or more processors, further cause the one or more processors to:
receive a routing table for a network associated with the multicast group; and
determine that the primary RP address is included in the routing table; and
where the one or more instructions, that cause the one or more processors to determine the active RP device, cause the one or more processors to:
determine the active RP device based on determining that the primary RP address is included in the routing table,
the active RP device being the primary RP device.

11. The non-transitory computer-readable medium of claim 10, where the one or more instructions, that cause the one or more processors to replace the virtual RP address with the address that identifies the active RP device, cause the one or more processors to:
replace the virtual RP address with the primary RP address.

12. The non-transitory computer-readable medium of claim 8,
where the one or more instructions, when executed by the one or more processors, further cause the one or more processors to:
receive a routing table for a network associated with the multicast group; and
determine that the secondary RP address is included in the routing table; and
where the one or more instructions, that cause the one or more processors to determine the active RP device, further cause the one or more processors to:
determine the active RP device based on determining that the secondary RP address is included in the routing table,
the active RP device being the secondary RP device.

13. The non-transitory computer-readable medium of claim 12, where the one or more instructions, that cause the one or more processors to replace the virtual RP address with the address that identifies the active RP device, cause the one or more processors to:
replace the virtual RP address with the secondary RP address.

14. The non-transitory computer-readable medium of claim 8,
where the multicast group is a first multicast group,
where the primary RP address is a first primary RP address associated with a first primary RP device,
where the secondary RP address is a first secondary RP address associated with a first secondary RP device, where the address that identifies the active RP device is a first address that identifies a first active RP device, where the first address that identifies the first active RP device replaces a first virtual RP address, associated with the first multicast group, included in the multicast information, and where the one or more instructions, when executed by the one or more processors, further cause the one or more processors to:

determine a second primary RP address and a second secondary RP address, the second primary RP address and the second secondary RP address being associated with a second multicast group identified in the multicast information, the second primary RP address identifying a second primary RP device, and the second secondary RP address identifying a second secondary RP device;

determine a second active RP device, the second active RP device being the second primary RP device or the second secondary RP device;

replace a second virtual RP address, associated with the second multicast group and included in the multicast information, with a second address that identifies the second active RP device, the second address that identifies the second active RP device being the second primary RP address or the second secondary RP address; and provide data to the first multicast group and the second multicast group based on the first address that identifies the first active RP device and the second address that identifies the second active RP device.

15. A method, comprising:

determining, by a device, multicast information associated with receiving data provided to a multicast group, the multicast information including a virtual rendezvous point (RP) address, the virtual RP address including a generic network address, associated with at least one of a source device or a destination device, that acts as a placeholder that is to be replaced with an address associated with an active RP device that is to be determined at a later time, the device being the source device or the destination device, and the multicast information identifying the multicast group;

identifying, by the device, a primary RP address and a secondary RP address associated with the multicast group, the primary RP address identifying a primary RP device assigned to the multicast group and the secondary RP address identifying a secondary RP device assigned to the multicast group;

identifying, by the device, the active RP device, the active RP device being the primary RP device or the secondary RP device;

replacing, by the device, the virtual RP address with the address associated with the active RP device, the address associated with the active RP device being either the primary RP address or the secondary RP address; and receiving, by the device, data provided to the multicast group based on the address associated with the active RP device.

16. The method of claim 15, further comprising:

receiving, from an edge device, first information associated with the primary RP address and second information associated with the secondary RP address, where identifying the primary RP address and the secondary RP address associated with the multicast group comprises:

identifying the primary RP address and the secondary RP address based on the first information and the second information received from the edge device.

17. The method of claim 15, further comprising:

receiving a routing table for a network associated with the multicast group; and determining that the primary RP address is included in the routing table, where identifying the active RP device comprises:

identifying the active RP device based on determining that the primary RP address is included in the routing table, the active RP device being the primary RP device.

18. The method of claim 17, where replacing the virtual RP address with the address associated with the active RP device comprises:

replacing the virtual RP address with the primary RP address.

19. The method of claim 15, further comprising:

receiving a routing table for a network associated with the multicast group;

determining that the primary RP address is not included in the routing table, and determining that the secondary RP address is included in the routing table, where identifying the active RP device further comprises:

identifying the active RP device based on determining that the secondary RP address is included in the routing table, the active RP device being the secondary RP device.

20. The method of claim 19, where replacing the virtual RP address with the address associated with the active RP device comprises:

replacing the virtual RP address with the secondary RP address.

* * * * *